Patented Mar. 8, 1938

2,110,630

UNITED STATES PATENT OFFICE 2,110,630

SHELLAC BONDED ABRASIVE ARTICLES

Richard H. Martin, Worcester, Mass., assignor to Norton Company, Worcester, Mass., a corporation of Massachusetts No Drawing. Application November 25, 1935, Serial No. 51,483

3 Claims. (Cl. 51—280)

The invention relates to shellac bonded abrasive articles and with regard to its more specific features to shellac bonded grinding wheels.

One object of the invention is to provide a superior knife grinding cylinder wheel. Another object of the invention is to provide a superior saw tooth grinding wheel. Another object of the invention is to provide a cooler cutting shellac bonded abrasive wheel. Another object of the invention is to alter the characteristics of shellac for the bonding of abrasive particles. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein and the scope of the application of which will be pointed out in the following claims.

I provide a quantity of abrasive grain. Any desired abrasive substance may be used, such as any of the varieties of aluminum oxide, silicon carbide, or diamond grain. Also boron carbide or other carbide grain, such as tantalum or tungsten carbide grain, may be used, as well as quartz or garnet.

Any desired size of abrasive grain may be used, but so far as certain features of the invention are concerned I prefer to use abrasive grain which is substantially larger in individual grain size than the other grain substance now referred to.

I provide a quantity of cryolite grain. Cryolite is a natural double fluoride of sodium and aluminum and has a composition corresponding to the chemical formula $Na_3AlF_6$ or $3NaF.AlF_3$. I may use other insoluble fluoride substances having similar properties such as calcium fluoride, apatite, and the like. Cryolite occurs in a crystalline form having a specific gravity of 2.90 to 3 and a hardness of 2.5 Mohs's scale. The crystals are usually colorless to snow-white. Greenland cryolite containing 13.23% aluminum, 32.71% sodium and some $Mn_2O_3$, MgO, vanadic and phosphoric acids is the important commercial variety.

I prefer to use finely divided cryolite, for example 200 mesh grit size or smaller. With this grit size of cryolite I may use abrasive grain of the same or larger size, for example all the way up to 8 mesh grit size or even larger, if desired.

I further provide a quantity of powdered shellac. This may be formed by taking flake shellac and powdering it in a ball mill.

Providing a suitable mixing machine adapted thoroughly to mix materials, I place in it the desired quantity of abrasive grains and cryolite or other insoluble fluoride in finely divided grain form. I then start the mixing machine and pour into the mixture a desired quantity of some suitable plasticizer such as China-wood oil, linseed oil, or mineral oil. After continuing the mixing until all the grain, both abrasive and cryolite, is coated with a film of oil or the like, I add the desired quantity of powdered shellac.

Taking a desired quantity of the mixture from the mixing machine, I place it in a mold of the desired shape and press it. I may use a hot press to achieve a dense structure of the "green" wheel or other article. On the other hand, I may preheat the mixture in the mold in a suitable oven and thereafter press in a cold press. In the case of preheating I prefer to carry the temperature to around 330° F. I maintain the mixture at this temperature for a number of hours, depending upon the thickness of the wheel and grade thereof. For a cylinder wheel 4" in length and 14" diameter with a 1" rim, that is a 12" hole, a total heating period of two hours and three-quarters is satisfactory.

In the case of hot pressing, the temperature preferred is approximately 330° F. and the heat and pressure may be applied for a slightly less period of time to reach good results in actual practice.

After the mixture is heated and pressed to form the "green" wheel it is taken out of the mold and given the usual thermo setting treatment in an oven or the like. For example, the unbaked or "green" wheel may be left in the oven for forty hours under temperature conditions of in the neighborhood of 300° F.

Considering now the proportions of the ingredients, the invention is not limited thereto. I prefer to use a substantial quantity of cryolite, for example almost the same thereof as the amount of shellac, by weight. With respect to the relative quantities of shellac and abrasive grain, any relative amounts thereof that have been used may be employed. The cryolite is to a certain extent to be considered part of the bond and in making the wheel according to a particular bond formula this factor may be considered. Practical wheels have been made within wide limits of the relative proportions of grain and shellac and, for example, as little as 5% by weight of shellac or as much as 30% by weight of shellac may be used. For achieving the beneficial results according to the present invention the amount of cryolite should be substantially 10% by weight of the shellac or 1% by weight of the abrasive grain and as stated, however, very much more cryolite may be employed; for example four times as much cryolite as shellac by volume may be used.

The resultant wheels, cylinders, abrasive shapes, or the like are characterized by cool grinding and free cutting. The cryolite being insoluble has no chemical reaction with the shellac, so far as I am aware. Although I am not certain why it is that beneficial results are achieved according to the invention, it may be that the cryolite particles give stiffness to the shellac bond so that it is rendered less plastic in the final product. Probably also they render it more brittle. A bond which will not flow but which breaks out in small quantities during grinding has certain advantages over a plastic bond in that sharp edges of abrasive grains are more readily exposed. At the same time, since the bond is somewhat stronger than shellac without this filler, there is less tendency for the abrasive particles to break loose altogether.

Not guaranteeing the correctness of the foregoing theories, I nevertheless note that knife grinding cylinders made in accordance with the invention are cooler cutting and last longer. Furthermore, saw gumming wheels made in accordance with the invention exhibit the same properties.

Instead of using natural cryolite I may use an artificial cryolite having approximately the formula already given.

While one specific method of proceeding has been described herein, it must be understood that so far as the product itself is concerned, other methods of manufacture may be employed. The method described, however, in which the abrasive grains and cryolite are mixed together with a suitable plasticizer in advance of the introduction of the shellac, in all cases where the cryolite or other insoluble fluoride is materially smaller than the abrasive grain, has certain definite advantages and results. Among these may be mentioned the fact that the abrasive grain particles are coated with the cryolite grain which thus form clusters. Each abrasive grain may be considered as surrounded by a quantity of cryolite grains in substantial contact therewith. Upon adding the shellac, the shellac sticks to the coating of oil and the resultant product comprises a grinding wheel in which the individual grains are joined together by a bond consisting of shellac and cryolite enveloping the grain and bond posts consisting of shellac with little or less cryolite or in some cases none at all. I believe that one reason for the improved results in grinding is due to the fact that the presence of the cryolite grains in contact with the abrasive grains prevents the shellac from smearing over the abrasive grains during grinding. In other words, to a certain extent the cryolite grains abrade the shellac bond during grinding to wear it away at the locus of the abrasive grains.

It will thus be seen that there has been provided by this invention a method and an article in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:—

1. An abrasive wheel comprising a body of abrasive grains united by a bond of shellac containing an insoluble fluoride incorporated directly therein which is capable of and proportioned for giving greater stiffness to the shellac bond and causes cooler grinding under normal and otherwise constant conditions.

2. An abrasive wheel comprising a body of abrasive grains integrally united together by a bond of shellac containing finely divided cryolite incorporated directly therein which coacts with the shellac to render it less plastic and stronger.

3. An abrasive wheel comprising a body of abrasive grains united by a bond of shellac containing a finely divided insoluble fluoride material directly incorporated therein at the point where the shellac is in contact with the abrasive grains, said fluoride particles adhering to the individual abrasive grains as a surface coating thereon and being proportioned for and capable of modifying the shellac bond so as to render it less plastic and of greater tenacity, the aforesaid finely divided particles acting to prevent smearing of the abrasive grains with the shellac bond, thereby making the wheel cool grinding and free cutting.

RICHARD H. MARTIN.